United States Patent
Sheen et al.

(10) Patent No.: US 9,756,518 B1
(45) Date of Patent: Sep. 5, 2017

(54) METHOD AND APPARATUS FOR DETECTING A TRAFFIC SUPPRESSION TURNING POINT IN A CELLULAR NETWORK

(71) Applicant: Futurewei Technologies, Inc., Plano, TX (US)

(72) Inventors: Baoling S. Sheen, Kildeer, IL (US); Jin Yang, Bridgewater, NJ (US); Yanchi Liu, Harrison, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/147,622

(22) Filed: May 5, 2016

(51) Int. Cl.
   *H04W 28/08* (2009.01)
   *H04W 24/08* (2009.01)
   *H04W 24/10* (2009.01)
   *H04W 16/18* (2009.01)

(52) U.S. Cl.
   CPC ........... *H04W 24/08* (2013.01); *H04W 16/18* (2013.01); *H04W 24/10* (2013.01)

(58) Field of Classification Search
   CPC ..... H04W 28/08; H04W 16/18; H04W 16/22; H04W 24/02
   USPC ...................... 455/423, 424, 425, 453, 456.1
   See application file for complete search history.

(56) References Cited

U.S. PATENT DOCUMENTS

| | | | |
|---|---|---|---|
| 2015/0087325 A1* | 3/2015 | Nuss | H04W 28/08 455/453 |
| 2015/0341226 A1* | 11/2015 | Griff | H04L 43/067 455/456.1 |
| 2016/0050588 A1* | 2/2016 | Schoenen | H04W 28/08 455/453 |
| 2016/0119816 A1* | 4/2016 | Yasukawa | H04W 48/20 455/453 |
| 2016/0174103 A9* | 6/2016 | Harrang | H04W 28/08 455/405 |
| 2016/0174104 A1* | 6/2016 | Jang | H04W 28/08 455/453 |
| 2016/0205697 A1* | 7/2016 | Tan | H04W 24/02 370/329 |

* cited by examiner

*Primary Examiner* — Cong Tran
(74) *Attorney, Agent, or Firm* — Slater Matsil, LLP

(57) ABSTRACT

Methods and apparatus for detecting a traffic suppression turning point in a communications system based on traffic behavior are provided. Models representing relationship between traffic loads and a key performance indicator of a cell or a cluster of cells may be built and tested to generate a set of prediction errors corresponding to a plurality of traffic load ranges. The prediction errors are examined against a criteria to determine a traffic suppression turning point in terms of traffic loads. The models built may also be used to calculate a set of KPI slope values corresponding to different traffic load ranges. The set of KPI slope values are examined against a criteria to determine a traffic suppression turning point in terms of traffic loads.

31 Claims, 8 Drawing Sheets

METHOD AND APPARATUS FOR DETECTING A TRAFFIC SUPPRESSION TURNING POINT IN A CELLULAR NETWORK

TECHNICAL FIELD

The present invention relates to a method and apparatus for wireless communications, and, in particular embodiments, to a method and apparatus for detecting a traffic suppression turning point in a cellular network.

BACKGROUND

Wireless telecommunication service providers generally monitor network performance constantly to ensure high quality services are provided to their subscribers. User experience of network services may degrade for various reasons. As more and more wireless devices and applications being added to networks, user experience of a wireless network degrades when the wireless network reaches its capacity or resource limit. It is desirable to develop methods and techniques to improve user experience when networks reach their capacity or resource limits.

SUMMARY

Technical advantages are generally achieved, by embodiments of this disclosure which describe a method and apparatus for detecting a traffic suppression turning point in a cellular network.

In accordance with an embodiment, a computer-implemented method for detecting a traffic suppression turning point in a communications system is provided. The computer-implemented method includes receiving, by a device, a set of measurement values of a key performance indicator (KPI) generated in a wireless network experiencing traffic loads within a lower range during a first period, and predicting, by the device, prior to a subsequent period, values for the KPI if the wireless network experienced traffic loads within an upper range based on the set of measurement values of the KPI. The computer-implemented method also includes receiving, by the device, subsequent measurement values of the KPI generated in the wireless network experiencing traffic loads within the upper range during the subsequent period, and calculating, by the device, a prediction error for the KPI corresponding to the upper range, based on differences between the predicted values for the KPI and the subsequent measurement values of the KPI. The computer-implemented method further includes identifying, by the device, a traffic suppression condition in the wireless network based on the prediction error for the KPI when a prediction error criteria is satisfied. An apparatus for performing the method is also provided.

In accordance with another embodiment, an apparatus for detecting a traffic suppression turning point in a communications system is provided. The apparatus includes a non-transitory memory storage comprising instructions, and one or more processors in communication with the memory. The one or more processors execute the instructions to retrieve a set of measurement values of a key performance indicator (KPI) generated in a wireless network experiencing traffic loads within a lower range during a first period, and predict, prior to a subsequent period, values for the KPI if the wireless network experienced traffic loads within an upper range based on the set of measurement values of the KPI. The one or more processors also execute the instructions to retrieve subsequent measurement values of the KPI generated in the wireless network experiencing traffic loads within the upper range during the subsequent period, calculate a prediction error for the KPI corresponding to the upper range, based on differences between the predicted values for the KPI and the subsequent measurement values of the KPI, and identify a traffic suppression condition in the wireless network based on the prediction error for the KPI when a prediction error criteria is satisfied.

In accordance with yet another embodiment, an apparatus for detecting a traffic suppression turning point in a communications system is provided. The apparatus includes a non-transitory memory storage comprising instructions, and one or more processors in communication with the memory. The one or more processors execute the instructions to retrieve a set of measurement values of a key performance indicator (KPI) generated in a wireless network experiencing traffic loads within a load range during an evaluation period. The set of measurement values of the KPI is corresponding to the load range. The one or more processors also execute the instructions to calculate a slope for the KPI corresponding to the load range based on the set of measurement values of the KPI and the load range, and detect a traffic suppression condition based on at least the slope for the KPI.

In accordance with yet another embodiment, a non-transitory computer-readable media storing computer instructions for detecting a traffic suppression turning point in a communications system is provided. The computer instructions, when executed by one or more processors, cause the one or more processors to retrieve a set of measurement values of a key performance indicator (KPI) generated in a wireless network experiencing traffic loads within a load range during an evaluation period. The set of measurement values of the KPI is corresponding to the load range. The computer instructions also cause the one or more processors to calculate a slope for the KPI corresponding to the load range based on the set of measurement values of the KPI and the load range, and indicate a traffic suppression condition that is detected based on at least the slope for the KPI.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
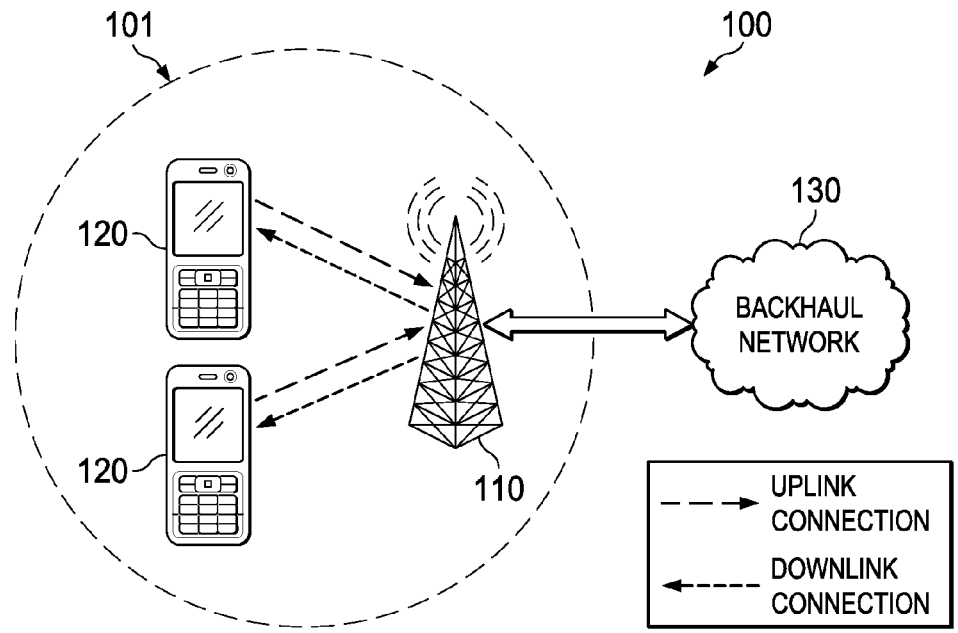
FIG. 1 illustrates a diagram of an embodiment wireless network.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Aspects of the present disclosure provide methods for detecting traffic suppression turning points in wireless networks based on traffic behavior changes. The methods may be applied to a cell or a cell cluster. When a wireless network reaches its capacity limit, traffic suppression occurs. Traffic behavior changes differently when a wireless network is operating with traffic suppression than without traffic suppression, and thus may be used to identify a traffic suppression turning point for the wireless network. A traffic suppression turning point refers to a value of traffic load that can be supported by a wireless network. Traffic behavior of a wireless network may be represented by a key performance indicator (KPI) of the wireless network. Examples of a KPI include a mean channel throughput, an average traffic volume per user equipment (UE), or a total traffic volume per cell.

In one embodiment, a method for detecting traffic suppression turning points in a wireless communications system is provided. In this example, a model may be built to capture a relationship between a KPI and traffic loads within a first range of traffic loads (i.e., a first load window), utilizing measurement values of the KPI generated in a wireless network when traffic loads in the wireless network are within the first load window. A range of traffic load may be represented by a load window which specifies a traffic load range. The model may be used to predict values of the KPI corresponding to a second load window. The second load window has a higher range than the first load window. A prediction error corresponding to the second load window may be calculated based on the predicted values corresponding to the second load window and measurement values of the KPI generated when traffic loads in the wireless network are within the second load window. A number of such models may be built corresponding to a plurality of first load windows, and used to predict values of the KPI corresponding to a plurality of second load windows. As a result, a set of prediction errors may be calculated corresponding to the plurality of second load windows. The set of prediction errors indicate the actual traffic behavior changes in their corresponding second load windows and may be used to identify a traffic suppression turning point for the wireless network. For example, a traffic suppression turning point may be identified when a prediction error in the set of prediction errors satisfies a criteria, and a traffic load value within the second load window corresponding to the prediction error that satisfies the criteria may be selected as the traffic suppression turning point.

In another embodiment, a slope value may be calculated utilizing measurement values of a KPI generated in a wireless network experiencing traffic loads within a load window. The slope value is associated with the load window. A set of such slope values may be calculated associated with a plurality of load windows. The plurality of load windows may specify different ranges of traffic loads, and may specify ranges of traffic loads in an increasing order. The set of slope values indicate the traffic behavior changes in the wireless network and may be used to identify a traffic suppression turning point for the wireless network. For example, a traffic suppression turning point may be identified when a slope value in the set of slope values satisfies a criteria, and a traffic load value within the load window associated with the slope value may be selected as the traffic suppression turning point.

FIG. 1 illustrates a network 100 for communicating data. The network 100 comprises a base station 110 having a coverage area 101 (i.e., a cell), a plurality of mobile devices 120, and a backhaul network 130. As shown, the base station 110 establishes uplink (dashed line) and/or downlink (dotted line) connections with the mobile devices 120, which serve to carry data from the mobile devices 120 to the base station 110 and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an enhanced base station (eNB), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. As used herein, the term "mobile device" refers to any component (or collection of components) capable of establishing a wireless connection with a base station, such as a user equipment (UE), a mobile station (STA), and other wirelessly enabled devices. In some embodiments, the network 100 may comprise various other wireless devices, such as relays, low power nodes, etc.

When a resource or capacity constraint is reached in a wireless network, network optimization techniques may be used to alleviate the resource constraint condition. For example, load balancing techniques may be used to redirect traffic from resource constrained cells due to traffic congestion to neighbor cells that are less resource constrained or congested. However, in some situations, a network optimization method alone may not be sufficient to improve user experience to a required level. This may happen typically for wireless networks in large cities or with matured communications technologies, such as a universal mobile telecommunications system (UMTS). In this case, network expansion approaches may be used as one of the mechanisms to improve network performance. For example, additional carriers or base stations may be added in a network to provide additional capacity or resources.

Typically, network expansion is planned and conducted by experienced engineers, who analyze network data including network traffic and usage data, and equipped network resources, determine whether network expansion is needed and how network expansion should be conducted. For example, engineers may perform analysis on resource utilization measurements and network capacity related information to identify or detect occurrence of network congestion or suppression, and to determine a traffic suppression condition or turning point. A traffic suppression condition or turning point may be indicated by a value of a traffic load that a wireless network can support, e.g., the number of UEs that can be served by a wireless network. This value of traffic load may be used to indicate a threshold of traffic load that the wireless network can support without triggering traffic suppression in the wireless network. When the number of UEs in the wireless network exceeds the turning point, the network may experience traffic suppression. Upon detection of occurrence of network congestion and determination of such a traffic suppression turning point, network expansion may be performed to increase capacity of the network.

Conventionally, identification and determination of a traffic suppression condition or turning point is performed using engineering rule-based approaches. As an example, an engineering rule-based approach may detect occurrence of a traffic suppression condition when a hard threshold is met, such as when the number of UEs in a wireless network is greater than a threshold, when resource utilization of the wireless network is greater than a threshold, or when an average mean channel throughput of the wireless network is less than a threshold. However, conventional approaches are labor intensive and time consuming because engineers have to perform analysis on a large amount of data related to network performance. Further, the analysis has to be performed separately for different wireless communications markets (e.g., networks in different areas or locations) or different cell clusters in the same network because resource utilization conditions may vary across different networks or across different cell clusters. In addition, the quality of the analysis highly depends on the experience of engineers performing the analysis, which adds further difficulties in network expansion planning.

In some embodiments, traffic behavior may be used to identify and determine traffic suppression conditions or turning points. Traffic behavior of a wireless network generally refers to the relationship between traffic volume related measurements in the network and network loading (or traffic loads), e.g. number of UEs served in the network. Examples of traffic volume related measurements include total traffic volume, total downlink traffic volume, traffic volume per UE, etc. Traffic behavior of a wireless network may change differently when a network is operating without traffic suppression and when the network is operating with traffic suppression. For example, the total traffic volume of a network may increase as the number of UEs served in the network is increasing. However, when the network is reaching its capacity constraint, its total traffic volume may reach a peak value and then goes down as the number of UEs in the network increases. As another example, when a network is reaching its capacity constraint, its average per UE traffic volume may remain constant within a small range or decrease, even if the number of UEs increases. These traffic behavior changes can be characterized using different key performance indicators (KPIs), and used to detect a traffic suppression condition of a wireless network.

Figure 2:
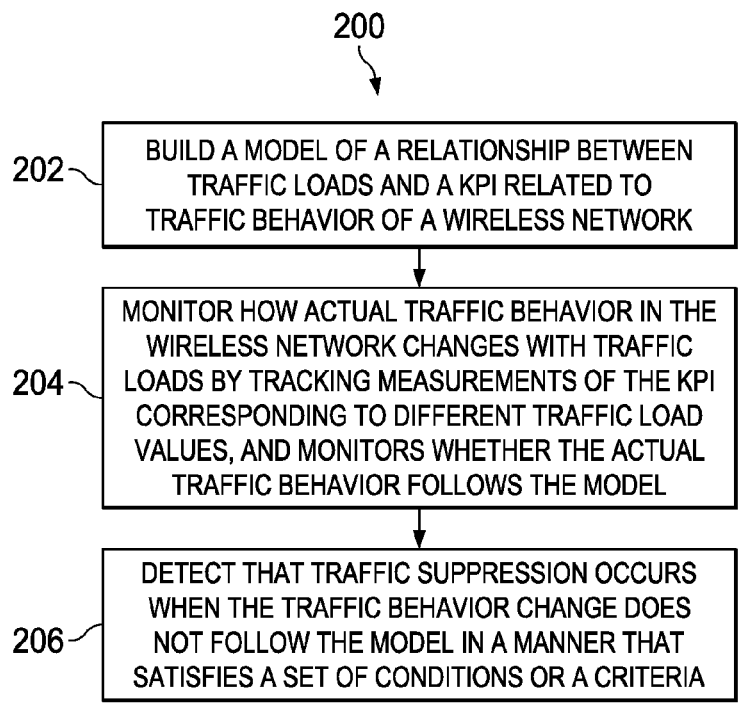
FIG. 2 illustrates a flowchart of an embodiment method for detecting a traffic suppression turning point in a communications system.

FIG. 2 illustrates an embodiment method 200 for detecting a traffic suppression turning point in a communications system. In this example, the traffic suppression turning point of a wireless network is identified based on traffic behavior change in the wireless network. The method 200 may be used for detecting a traffic suppression turning point of a cell associated with a base station or a cell cluster. As shown, at step 202, the method 200 builds a model of a relationship between traffic loads and a KPI related to traffic behavior of the wireless network. A traffic load may be represented by the average number of total UEs, an average number of active UEs, etc. The KPI related to traffic behavior of the wireless network may be a mean channel throughput, an average traffic volume per UE, or a total traffic volume, such as a total downlink traffic volume, or a total uplink traffic volume of the wireless network. In one embodiment, the model may be built using values of the KPI measured or observed corresponding to instances of traffic loads during a time period. The model generally indicates how traffic behavior changes with traffic loads of the wireless network when there is no traffic suppression or when capacity limit is not yet reached in the wireless network. Different models may be built to capture relationships between traffic loads and different KPIs.

At step 204, the method 200 monitors how actual traffic behavior in the wireless network changes with traffic loads by tracking measurements of the KPI corresponding to different traffic load values, and monitors whether the actual traffic behavior follows the model. At step 206, the method 200 detects that traffic suppression occurs when the traffic behavior change does not follow the model in a manner that satisfies a set of conditions or a criteria. The method 200 may then determine a traffic suppression turning point based on the traffic loads at which traffic suppression occurs. As one example, the method 200 may build a model reflecting how the KPI changes with different numbers of UEs in the wireless network during a first evaluation period. The method 200 may then receive KPI measurement values corresponding to different numbers of UEs during a second evaluation period, and determine whether the KPI changes according to the model by comparing the received KPI measurement values with the built model corresponding to different numbers of UEs. Differences between the KPI measurement values and the built model corresponding to different numbers of UEs may be generated and represented in a manner that can be used to detect traffic suppression. A traffic suppression turning point may be identified when one of the differences, corresponding to a particular number UEs, between the KPI measurements and the built model satisfies a pre-defined criteria.

In some embodiments, the method 200 may identify multiple traffic suppression turning points for a wireless network using relationships between different KPIs and traffic loads, and one of the multiple traffic suppression turning points may be selected and used for network expansion. For example, using the average per UE traffic volume as a KPI, a first traffic suppression turning point may be identified when the number of UEs is 23, and using the mean channel throughput as a KPI, a second traffic suppression turning point may be identified when the number of UEs is 27. In this case, a traffic suppression turning point may be selected from the first and the second turning points. For example, a conservative consideration may cause the selection of traffic suppression turning point with higher loads, and a more aggressive consideration may select a traffic suppression turning point with lower loads. Based on the traffic suppression turning point identified or detected, network planning engineers may plan network expansion procedures taking into consideration of conditions such as the additional amount of traffic that need to be accommodated, the number of UEs that are expected to be served, available resources, and/or other conditions that are to be met for expanding the network. The wireless network is then configured according to the network expansion plan, such as by adding one or more base stations or carriers.

Figure 3:
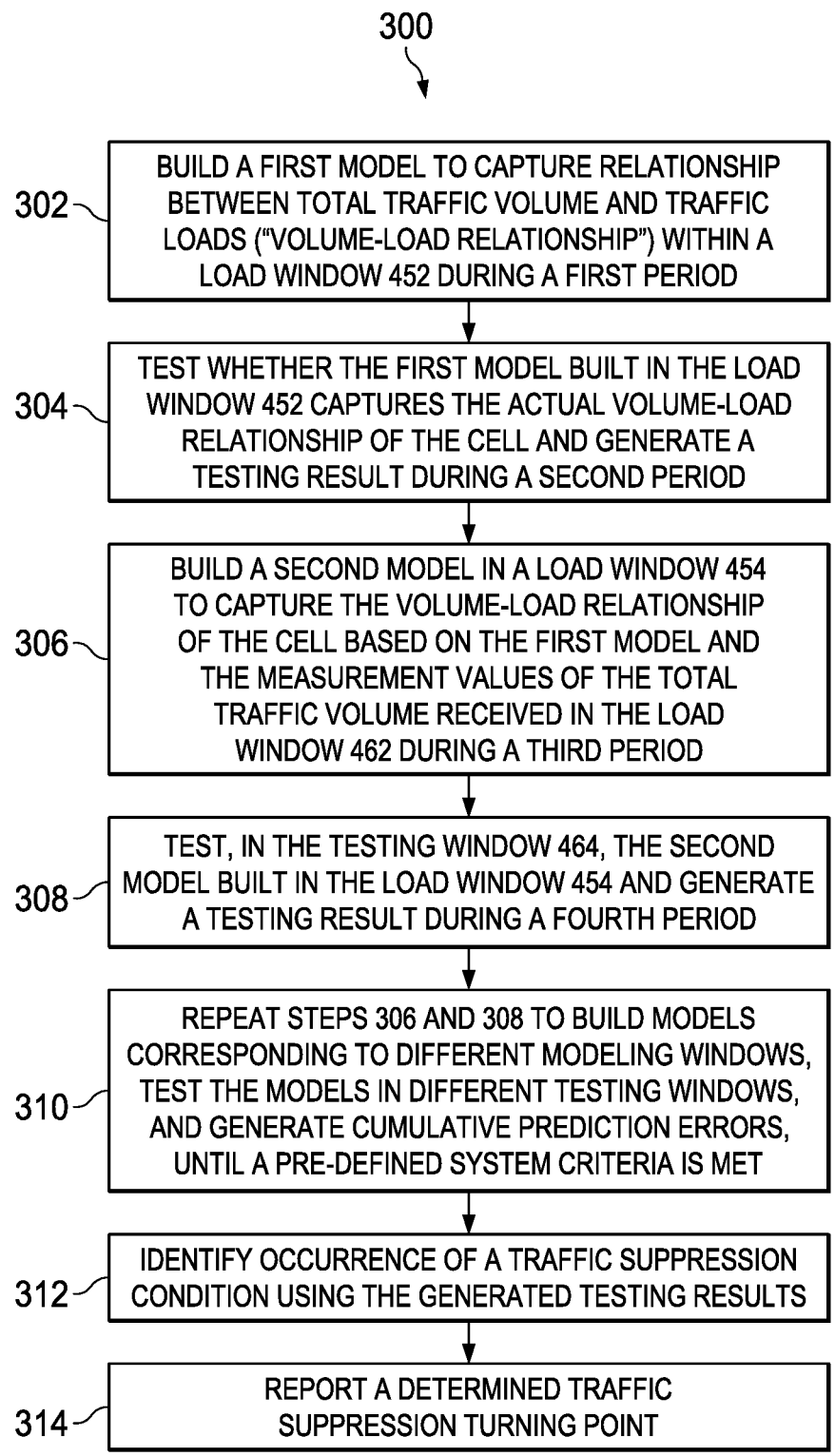
FIG. 3 illustrates a flowchart of an embodiment method for detecting a traffic suppression turning point of a cell.
Figure 4:
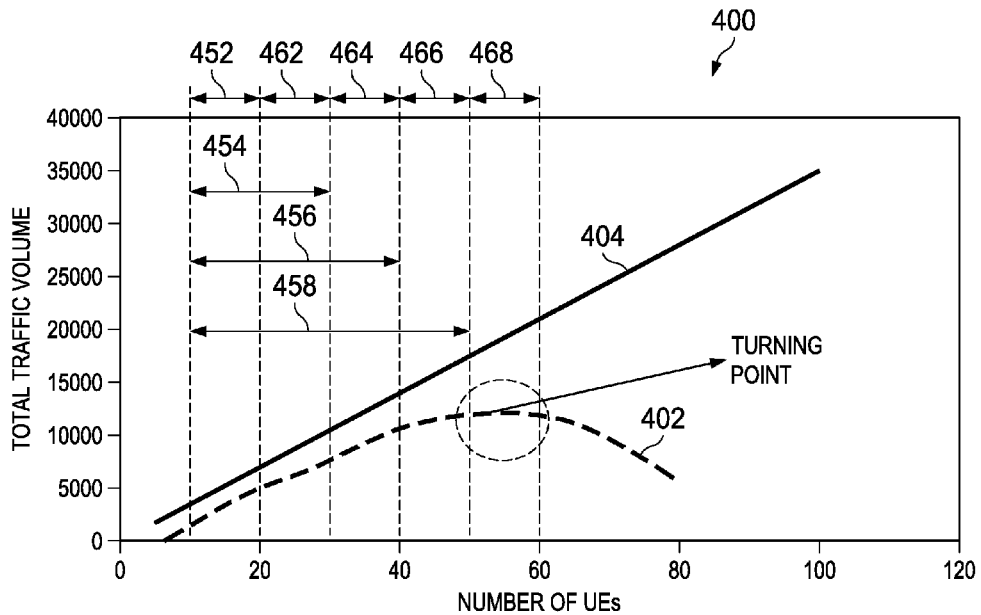
FIG. 4 illustrates a graph of a relationship between total traffic volume and the number of user equipments (UEs) in a cell.

FIG. 3 illustrates a flowchart of an embodiment method 300 for detecting a traffic suppression turning point of a cell. The method 300 may also be applied to a cluster of cells. The method 300 will be described in detail later in reference to both FIG. 3 and FIG. 4. Generally, the method 300 builds models modeling relationship between traffic loads and a KPI of the cell corresponding to different ranges of traffic loads, while monitoring actual traffic behavior changes of the cell, i.e., the changes of the KPI. When the traffic behavior changes differently than what the models indicate, traffic suppression may have occurred. A range of traffic loads may be represented by a load window. A load window herein specifies a first value of a traffic load as the beginning position of the load window, and a second value of a traffic load as the ending position of the window. The size of the window is determined by the second value minus the first value. In the example of FIG. 3 and FIG. 4, the total traffic (downlink traffic) volume of the cell is used as the KPI for determining a traffic suppression turning condition or point, and the cell (or a cell cluster) will not be in a traffic congestion or suppression state when the number of UEs served in the cell is less than a threshold. Those of ordinary skill in the art would recognize that other applicable KPIs, such as the average per UE traffic volume, the mean channel throughput, etc., may also be used, and the threshold may be learned from network history data, and determined based on engineering knowledge or according to other applicable methods.

FIG. 4 illustrates a graph 400 showing a relationship between the total traffic volume and the number of UEs in a cell. The x-axis of the graph 400 represents the number of UEs served in the cell and the y-axis represents the total traffic volume. The graph 400 shows a curve 402 and a curve 404. The curve 402 indicates how the actual total traffic volume in the cell varies as the number of UEs increases, and the curve 404 indicates how the total traffic volume in the cell may vary as the number of UEs increases if capacity limit of the cell is not considered. FIG. 4 also illustrates a number of load windows 452-458 and 462-468 corresponding to the x-axis. As described above, each of the load windows specifies a traffic load range. As an example, the load window 452 specifies a traffic load range from 10 UEs to 20 UEs, and the size of the load window 452 is 10. As another example, the load window 462 specifies a traffic load range from 20 UEs to 30 UEs with a size of 10.

Referring to FIG. 3 and FIG. 4, at step 302, the method 300 builds a first model to capture the relationship between total traffic volume and traffic loads ("volume-load relationship") within the load window 452 during a first period. In this example, the load window 452 represents a load range of 10-20 UEs. In one embodiment, the method 300 may receive and record actual values of the total traffic volume generated in the cell corresponding to values of different traffic loads within the load window 452, and build the model using the actual values to modeling how the total traffic volume in the cell varies with the traffic loads within the load window 452. The load window 452 may also be referred to as a modeling window because a model is built for traffic loads in this window.

At step 304, the method 300 tests whether the first model built in the load window 452 captures the actual volume-load relationship of the cell and generates a testing result during a second period. In one embodiment, the method 300 utilizes the first model to predict values of the total traffic volume of the cell if the cell experienced traffic loads within the load window 462. The load window 462 specifies a load range higher than the load window 452. As shown, the load window 462 represents a load range of 20-30 UEs. The load window 462 may also be referred to as a testing window because a model is tested in this window. The prediction will result in predicted values of the total traffic volume corresponding to different traffic loads within the load window 462. The method 300 may then receive and record measurement values of the total traffic volume generated in the cell corresponding to values of different traffic loads within the load window 462. The predicted values of the total traffic volume and the received actual values of the total traffic volume in the load window 462 are then used to calculate total traffic volume prediction errors corresponding to values of traffic loads in the load window 462. Each of the total traffic volume prediction errors is corresponding to one instance of a traffic load in the testing window 462. For example, eleven prediction errors may be calculated for the testing window 462 corresponding to numbers of UEs from 20 to 30. In one example, these prediction errors may further be used to calculate a first cumulative prediction error CUMSUM1 corresponding to the testing window 462 and the first model.

At step 306, the method 300 builds a second model in the load window 454 to capture the volume-load relationship of the cell based on the first model and the measurement values of the total traffic volume received in the load window 462 during a third period. The load window 454 specifies a range of 10-30 UEs. In one embodiment, the second model may be build corresponding to a load window that has a higher range than the load window in which the first model is built. For example, the load window 454 may specify a range of 12-28. The second model may also be build corresponding to a load window that has the same size as or greater (or less) size than the load window in which the first model is built, e.g. the load window may have a range of 20-30 UEs. At step 308, the method 300 tests, in the testing window 464, the second model built in the load window 454, and generates a testing result during a fourth period. The testing window 464 for the second model may have a size that is the same as or different from that of the testing window for the first model. The testing window 464 for the second model also specifies a higher range than the testing window for the first model and the load (modeling) window 454. A second cumulative prediction error CUMSUM2 may be calculated corresponding to the testing window 464 and the second model in a similar way that calculates the first cumulative prediction error CUMSUM1. That is, the method 300 utilizes the second model to predict values of the total traffic volume of the cell assuming that the cell experienced traffic loads within the testing window 464, and receives and records measurement values of actual total traffic volume generated in the cell corresponding to values of different traffic loads within the testing window 464. The predicted values and the received values of the total traffic volume corresponding to the testing window 464 are then used to calculate the second cumulative prediction CUMSUM2.

At step 310, the method 300 repeats steps 306 and 308 to continue to build subsequent models corresponding to different modeling windows, test the models in different testing windows in a sequence of periods, and generate testing results, e.g., cumulative prediction errors, until a pre-defined system criteria is met. For example, the method 300 builds a third model in the modeling window 456, and tests the third model in the testing window 466 generating a third cumulative prediction error CUMSUM3. The method 300 may continue to build a fourth model in the modeling window 458, and test the fourth model in the testing window 468 generating a fourth cumulative prediction error CUMSUM4. The testing window 466 specifies a load range of 40-50 UEs, and the testing window 468 specifies a load range of 50-60 UEs. The method 300 may generate n cumulative prediction errors {CUMSUM1, CUMSUM2, . . . CUMSUMk, . . . CUMSUMn} corresponding to n models and n different testing windows. Each model may be corresponding to a modeling window that specifies a different traffic load range and/or a different window size. Each model may be tested in a testing window with a higher range than that of the modeling window corresponding to the model. The range and size of a modeling window or a testing window may be pre-defined, or adjusted adaptively when needed. The system criteria may be satisfied when a testing window includes an instance of traffic load that is greater than a pre-defined load threshold. For example, the load threshold is 43 UEs, and the method 300 will stop when a testing window specifies a range of 40-50 UEs. Alternatively, the system criteria may be satisfied when less than a threshold number of UEs are observed during testing of a model in a testing window. That is, when the cell does not serve at least the threshold number of UEs to generate measurement values of the KPI for testing the model, the method 300 stops.

At step 312, the method 300 identifies occurrence of a traffic suppression condition using the generated testing results, e.g., the n cumulative prediction errors. In one embodiment, the method 300 calculates a mean value $\mu$ and a standard deviation $\sigma$ of the n cumulative prediction errors, and identifies that a traffic suppression condition occurs when a cumulative prediction error CUMSUMk corresponding to a testing window k in the n testing windows satisfies the following three conditions:

(i) the cumulative prediction error CUMSUMk is the greatest among the n cumulative prediction errors, i.e., CUMSUMk>CUMSUMi, $1 \leq i \leq n$ and $i \neq k$;
(ii) the cumulative prediction error CUMSUMk is greater than $\mu+\sigma$; and
(iii) the cumulative prediction error CUMSUMk is greater than a threshold.

In one embodiment, the condition (iii) above may be that the cumulative prediction error CUMSUMk is greater than the cumulative prediction error CUMSUMk-1 by a pre-defined threshold. This may be represented by CUMSUMk/CUMSUMk-1>T.

The cumulative prediction error CUMSUMk corresponding to the testing window k indicates that suppressed traffic occurs when the number of UEs served in the cell is in a range specified by the testing window k. A traffic suppression turning point or condition may be determined to be one of the numbers of UEs in the range specified by the testing window k. For example, if the cumulative prediction error corresponding to the testing window 468 satisfies the three conditions above, a traffic suppression condition or turning point may be identified when the number of UEs in the cell is in between 50 UEs and 60 UEs. The traffic suppression turning point may be determined to be the lowest traffic load in the range of the testing window 468, i.e., 50 UEs. Alternatively, the traffic suppression turning point may be determined to be the greatest traffic load in the range of the testing window 468, i.e., 60 UEs. In another embodiment, the traffic suppression turning point may be determined to be the median traffic load in the range of the testing window 468, i.e., 55 UEs. In yet another embodiment, the traffic suppression turning point may be determined to be any value of traffic load in the range of the testing window 468, e.g., 51 UEs, or 57 UEs. Determination of the value of traffic load specified in the testing window as the traffic suppression turning point may be based on conditions such as resources available for cell expansion, throughput requirements of the cell, or UEs served by the cell, and cell history data, etc. These conditions may be collectively considered as a traffic suppression detection strategy.

At step 314, the method 300 reports the determined traffic suppression turning point. The method 300 may identify different traffic suppression turning points by using models of relationships between traffic loads and different KPIs. The identified different traffic suppression turning points may then be used to determine a single traffic suppression turning point based on traffic suppression detection strategies. Network planning engineers will use the single traffic suppression turning point for planning and performing network expansion in order to increase network capacity to serve UEs.

Figure 5:
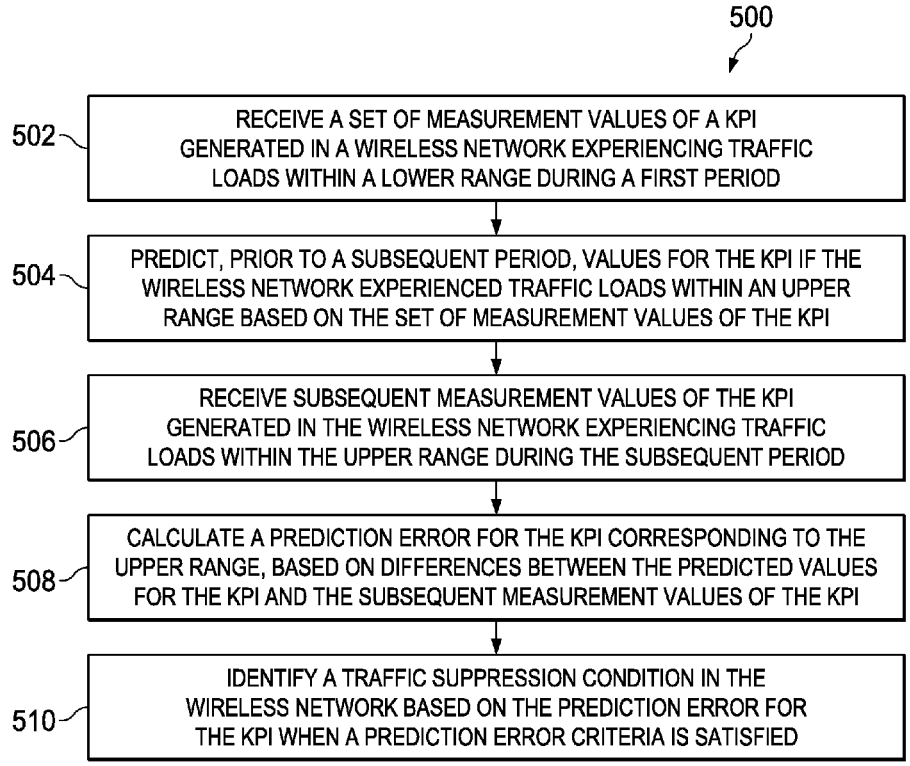
FIG. 5 illustrates a flowchart of another embodiment method for detecting a traffic suppression turning point in a communications system.

FIG. 5 illustrates a flowchart of another embodiment method 500 for detecting a traffic suppression turning point in a communications system. At step 502, the method 500 receives a set of measurement values of a KPI generated in a wireless network experiencing traffic loads within a lower range during a first period. At step 504, the method 500 predict, prior to a subsequent period, values for the KPI if the wireless network experienced traffic loads within an upper range based on the set of measurement values of the KPI. At step 506, the method 500 receives subsequent measurement values of the KPI generated in the wireless network experiencing traffic loads within the upper range during the subsequent period. At step 508, the method 500 calculates a prediction error for the KPI corresponding to the upper range, based on differences between the predicted values for the KPI and the subsequent measurement values of the KPI within the upper range. At step 510, the method 500 identifies a traffic suppression condition in the wireless network based on the prediction error for the KPI when a prediction error criteria is satisfied. The traffic suppression condition may refer to a threshold number of UEs that can be supported by the wireless network. The method 500 may further send an indication indicating detection of the traffic suppression condition. The KPI may be a mean channel throughput, an average traffic volume per UE, or a total traffic volume per cell.

In one embodiment, the method 500 may calculate a cumulative sum of prediction errors for the KPI based on differences between the predicted values and the subsequent actual measurement values of the KPI within the upper range. For example, the method 500 may determine a difference between each subsequent measurement value of the KPI and a corresponding predicted value of the KPI over each observed instance, during which the wireless network experiences traffic loads within the upper range during the subsequent period, and calculate a cumulative sum of the differences between the subsequent measurement values of the KPI and the predicted values of the KPI.

In one embodiment, the method 500 may iteratively predict values for the KPI and calculate a set of prediction errors for the KPI corresponding to a plurality of upper ranges. The plurality of upper ranges are different than one another. For example, the method 500 may repeat the steps of 502, 504, 506 and 508 to calculate a set of prediction errors for the KPI corresponding to a plurality of upper ranges in a sequence of evaluation periods, during which the wireless network experienced traffic loads during first periods in lower ranges than that experienced during subsequent periods. The prediction error criteria may be satisfied when a first prediction error in the set of prediction errors satisfies a set of conditions, and the first prediction error is corresponding to one of the plurality of upper range. In one example, the first prediction error satisfies the set of conditions when (i) the first prediction error exceeds any other prediction errors in the set of prediction errors; (ii) the first prediction error exceeds an average of the set of prediction errors by at least one standard deviation of the set of prediction errors; and (iii) the first prediction error is greater than a threshold. Condition (iii) may also be that when the first prediction error exceeds a second prediction error in the set of prediction errors by a margin.

Figure 6:
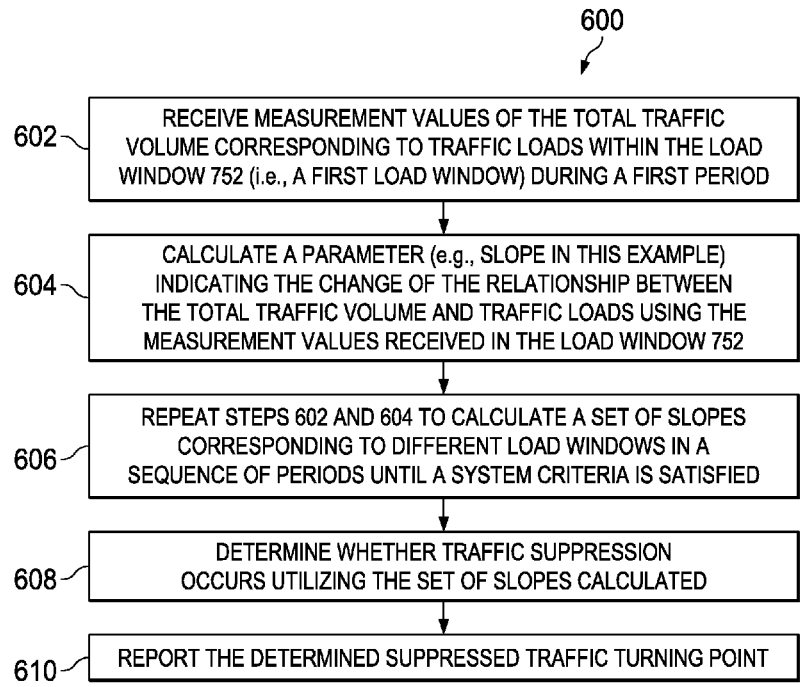
FIG. 6 illustrates a flowchart of another embodiment method for detecting a traffic suppression turning point of a cell.
Figure 7:
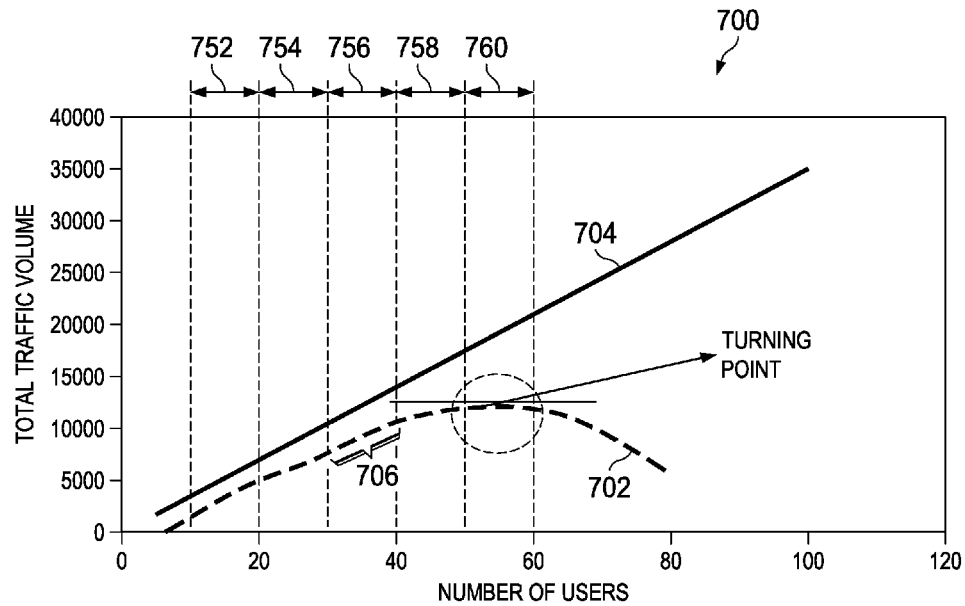
FIG. 7 illustrates a graph of a relationship between total traffic volume and the number of UEs in a cell.

FIG. 6 illustrates a flowchart of yet another embodiment method 600 for detecting a traffic suppression turning point of a cell. Generally, the method 600 monitors changes of a KPI in the cell with traffic loads corresponding to different load windows, and detects occurrence of a traffic suppression condition when a pre-defined parameter corresponding to the changes of KPI satisfies a criteria. The method 600 may also be applied to a cluster of cells, in which case the method monitors changes of a KPI with traffic loads in the cluster of cells. The method 600 will be described in detail later in reference to both FIG. 6 and FIG. 7. In the example of FIG. 6 and FIG. 7, total traffic volume of the cell is used as the KPI for detecting a traffic suppression turning condition, and the cell (or a cell cluster) will not be in a traffic congestion or suppression state when the number of UEs served in the cell is less than a threshold. One of ordinary skill in the art would recognize that other applicable KPIs, such as the average per UE traffic volume, the mean channel throughput, etc., may be also used, and the threshold may be learned from history data, and determined based on engineering knowledge or according to other applicable methods.

FIG. 7 illustrates a graph 700 of showing a relationship between total traffic volume and the number of UEs in a cell. The x-axis of the graph 700 represents the number of UEs served in the cell and the y-axis represents the total traffic volume. The graph 700 shows a curve 702 and a curve 704. The curve 702 indicates how the actual total traffic volume in the cell varies as the number of UEs increases, and the curve 704 indicates how the total traffic volume in the cell may vary as the number of UEs increases if capacity limit of the cell is not considered. FIG. 7 also illustrates a number of load windows 752-760 corresponding to the x-axis. In this example, each of the load windows has a size of 10, and the load windows 752-760 specify a total traffic load range of 10-60 UEs. It would be appreciated that these load windows may have different sizes, one load window may overlap with another load window, and the ranges of these load windows are in an increasing order.

Referring to FIG. 6 and FIG. 7, at step 602, the method 600 receives measurement values of the total traffic volume corresponding to traffic loads within the load window 752 (i.e., a first load window) during a first period. At step 604, the method 600 calculates a parameter indicating the change of the relationship between the total traffic volume and traffic loads using the measurement values received in the load window 752. The parameter is corresponding to the load window 752. In one embodiment, the parameter may be a slope for a KPI (i.e., a KPI slope) corresponding to traffic loads within a load window. In the example of FIG. 6 and FIG. 7, the parameter is a slope of a curve defined by values of the total traffic volume with respect to values of traffic loads within a load window. For example, the segment curve 706 of the curve 702 is defined by values of the total traffic volume with respect to values of traffic loads within the load window 756. The slope of the segment curve 706 may be calculated using any of the discrete samples on the segment curve 706 or may be an average slope of slopes calculated using different discrete samples on the segment curve 706.

At step 606, the method 600 repeats steps 602 and 604 to calculate a set of slopes corresponding to different load windows in a sequence of periods until a system criteria is satisfied. In one embodiment, the method 600 may pre-define a number of load windows specifying ranges of traffic loads in a specific order, e.g., an increasing order, where KPI slopes corresponding to the number of load windows are calculated. For example, the number of load windows may be defined to specify traffic load ranges including 5-15 UEs, 15-25 UEs, and 25-35 UEs. The number of load windows may alternatively be defined to specify traffic load ranges including 5-15 UEs, 10-20 UEs, and 15-30 UEs. One of ordinary skill in the art would recognize many variations for defining such load windows to monitor traffic behavior changes in a cell or a cluster of cells. The range and size of a load window may also be adjusted or defined during the operation of the method 600. KPI slopes corresponding to the number of pre-defined load windows may be calculated in the same order as that of the traffic load ranges specified by the load windows. For example, as shown in FIG. 7, five load windows are defined in an increasing order, and the method 600 may start from the load window 752 specifying a range of 10-20 UEs, calculating a first slope value. The method 600 may slide to a next load window 754 of a higher range of 20-30 UEs, and calculate a second slope value corresponding to the load window. The method 600 may continue to calculate a third slope value, a fourth slope value and a fifth slope value corresponding to the load windows 756, 758 and 760, respectively.

The system criteria may be satisfied when a load window includes an instance of traffic load that is greater than a pre-defined load threshold. For example, the load threshold is defined as 43 UEs, and the method 600 will stop when a load window specifies a range of 40-50 UEs. Alternatively, the system criteria may be satisfied when less than a threshold number of UEs are observed for calculating a slope value. That is, when the cell does not serve at least the threshold number of UEs to generate measurement values of the KPI for calculating a slope value, the method 600 stops. In another embodiment, the system criteria may be satisfied when the cell reaches a saturate state, i.e., a calculated slope is close to 0.

At step 608, the method 600 determines whether traffic suppression occurs utilizing the set of slopes calculated. In one embodiment, traffic suppression may be determined to occur when one of the following conditions is met:

(i) A slope corresponding to a load window has a significant change compared with a previous slope corresponding to a previous load window. For example, the change of the slope corresponding to the load window exceeds a threshold.

In another example, the change of the slope corresponding to the load window exceeds the change of a previous slope by a threshold; or (ii) A slope corresponding to a load window indicates that the cell is reaching a saturate state, i.e., the value of the slope is reaching or close to 0. This indicates that there is no significant increase in the total traffic volume even when the number of UEs increases.

The load window corresponding to a slope value that satisfies one of the above conditions indicates that suppressed traffic occurs when the number of UEs served in the cell falls in a range specified by the load window. A traffic suppression turning point or condition may be determined to be one of the numbers of UEs in that range. For example, if the slope value corresponding to the load window 760 satisfies one of the above conditions, a traffic suppression condition or turning point may be identified when the number of UEs in the cell is in between 50 UEs and 60 UEs. The traffic suppression turning point may be determined to be the lowest traffic load in the range of the load window 760, i.e., 50 UEs. Alternatively, the traffic suppression turning point may be determined to be the greatest traffic load in the range of the load window 760, i.e., 60 UEs. In another embodiment, the traffic suppression turning point may be determined to be the median traffic load in the range of the load window 760, i.e., 55 UEs. In yet another embodiment, the traffic suppression turning point may be determined to be any value of traffic load in the range of the load window 760, e.g., 53 UEs, or 58 UEs. Determination of a value of traffic load specified in the load window as the traffic suppression turning point may be based on traffic suppression detection strategies as described above.

At step 610, the method 600 may report the determined traffic suppression turning point. The method 600 may identify different traffic suppression turning points by using relationships between different KPIs and traffic loads. The identified different traffic suppression turning points may then be used by network planning engineers for planning and performing network expansion in order to increase network capacity to serve UEs.

Figure 8:
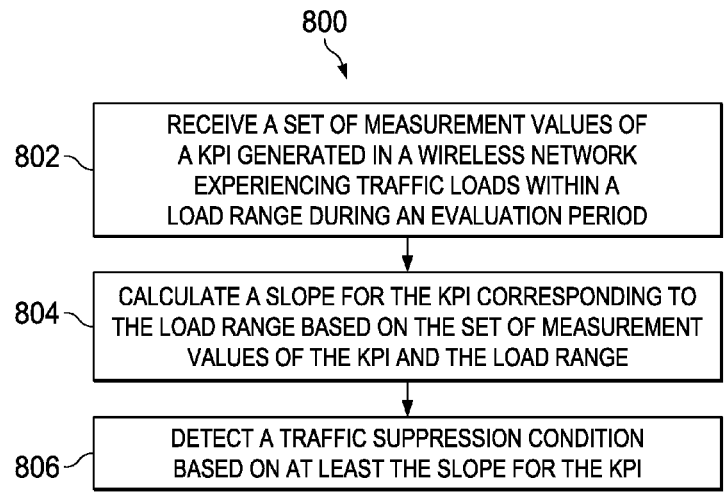
FIG. 8 illustrates a flowchart of yet another embodiment method for detecting a traffic suppression turning point in a communications system.

FIG. 8 illustrates a flowchart of yet another embodiment method 800 for detecting a traffic suppression turning point in a communications system. At step 802, the method 800 receives a set of measurement values of a KPI generated in a wireless network experiencing traffic loads within a load range during an evaluation period. The set of measurement values of the KPI corresponding to the load range. At step 804, the method 800 calculates a slope for the KPI corresponding to the load range based on the set of measurement values of the KPI and the load range. At step 806, the method 800 detects a traffic suppression condition based on at least the slope for the KPI. The traffic suppression condition may refer to a threshold number of UEs that can be supported by the wireless network. The KPI may be a mean channel throughput, an average traffic volume per UE, or a total traffic volume per cell. The method 800 may further send an indication indicating detection of the traffic suppression condition.

The method 800 may iteratively calculate a set of slopes for the KPI corresponding to a plurality of load ranges. For example, the method 800 may repeat the steps of 802 and 804 to calculate a set of slopes for the KPI corresponding to a plurality of load ranges in a sequence of evaluation periods, during which the wireless network experiences traffic loads within the plurality of load ranges. The plurality of load ranges is different than one another. In one embodiment, the method 800 may detect the traffic suppression condition when a first slope in the set of slopes for the KPI corresponding to the plurality of load ranges satisfies a criteria, where the first slope is corresponding to one of the plurality of load ranges. In one example, the criteria is satisfied when the first slope in the set of slopes for the KPI is smaller than a threshold. In another example, the criteria is satisfied when a difference between the first slope and a second slope in the set of slopes is greater than a threshold.

Embodiment methods in the present disclosure may be performed by a base station, a communications controller, a higher layer network node, or any other network element applicable for performing the embodiment methods to determine a traffic suppression condition or turning point. The embodiment methods may be implemented as computer-implemented methods performed by one or more processors according to computer instructions stored in one or more non-transitory memory storages. For example, the one or more processors may execute the instructions to retrieve KPI measurement values and determine a traffic suppression condition according to the embodiment methods described above.

Figure 9:
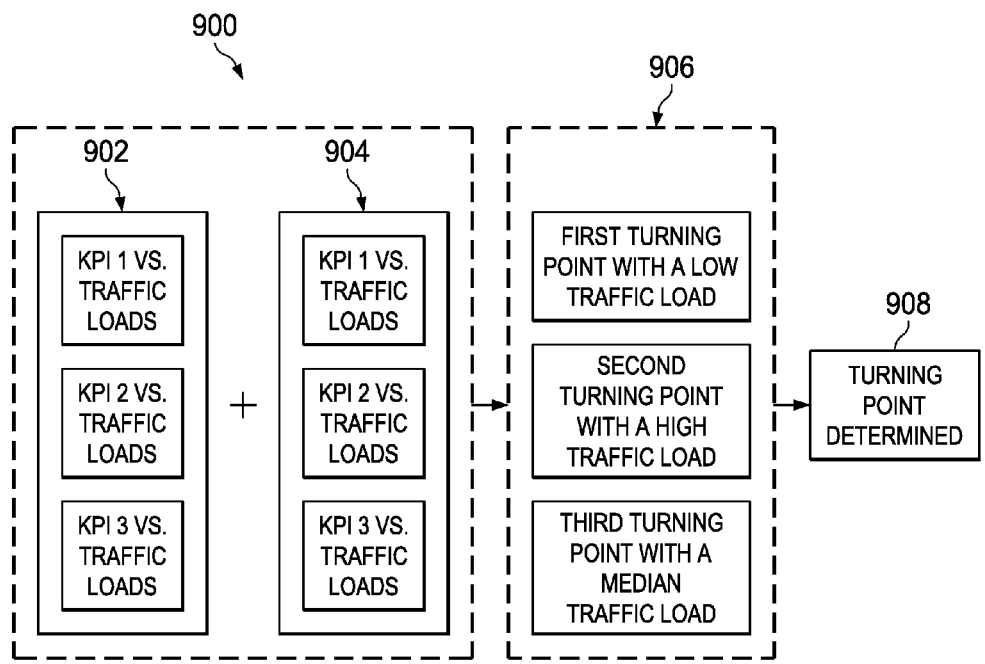
FIG. 9 illustrates a diagram of an embodiment method for determining a traffic suppression turning point in a communications system.

The embodiment methods above may be used separately or in combination to determine a traffic suppression turning point of a cell or a cluster of cells. Relationships between traffic loads and different KPIs may also be used to identify multiple traffic suppression turning points, with which a single traffic suppression turning point may be determined based on conditions or restrictions required for network expansion. FIG. 9 illustrates a diagram of an embodiment method 900 for determining a traffic suppression turning point in a communications system. This example uses both methods described with respect to FIG. 3 and FIG. 6 based on three different KPIs, i.e., KPI 1, KPI 2 and KPI 3. The three different KPI may include mean channel throughput, traffic volume per UE, and cell traffic volume. Block 902 shows that the method described with respect to FIG. 3 is performed using each of the three KPIs. In one example, models are built to capture relationships between traffic load and each of the three KPIs in modeling windows and tested in testing windows, as described with respect to FIG. 3 and FIG. 4. A traffic suppression condition corresponding to a traffic load range is identified based on prediction errors in the testing windows. Accordingly, a first set of three traffic load ranges is identified in accordance with the three different KPIs. Different ranges and sizes may be used for the modeling windows and testing windows in identifying the three traffic load ranges. Block 904 shows that the method described with respect to FIG. 6 is performed using each of the three KPIs. In one example, slope values are calculated corresponding to each of the three KPIs in a plurality of load windows, and are used to identify a traffic load range in which traffic suppression occurs. As a result, a second set of three traffic load ranges is identified in accordance with the three different KPIs using the method described with respect to FIG. 6 and FIG. 7. The first and the second set of three traffic load ranges are then used collectively to generate a traffic suppression turning point based on detection strategies applied. For example, in block 906, the first set of three traffic load ranges and the second set of three traffic load ranges are used collectively to generate a first traffic suppression turning point with a low traffic load, a second traffic suppression turning point with a high traffic load, and a third traffic suppression turning point with a median traffic load. In block 908, based on the three traffic suppression turning points, a traffic suppression turning point is determined which is used to further plan and perform network expansion.

Figure 10:
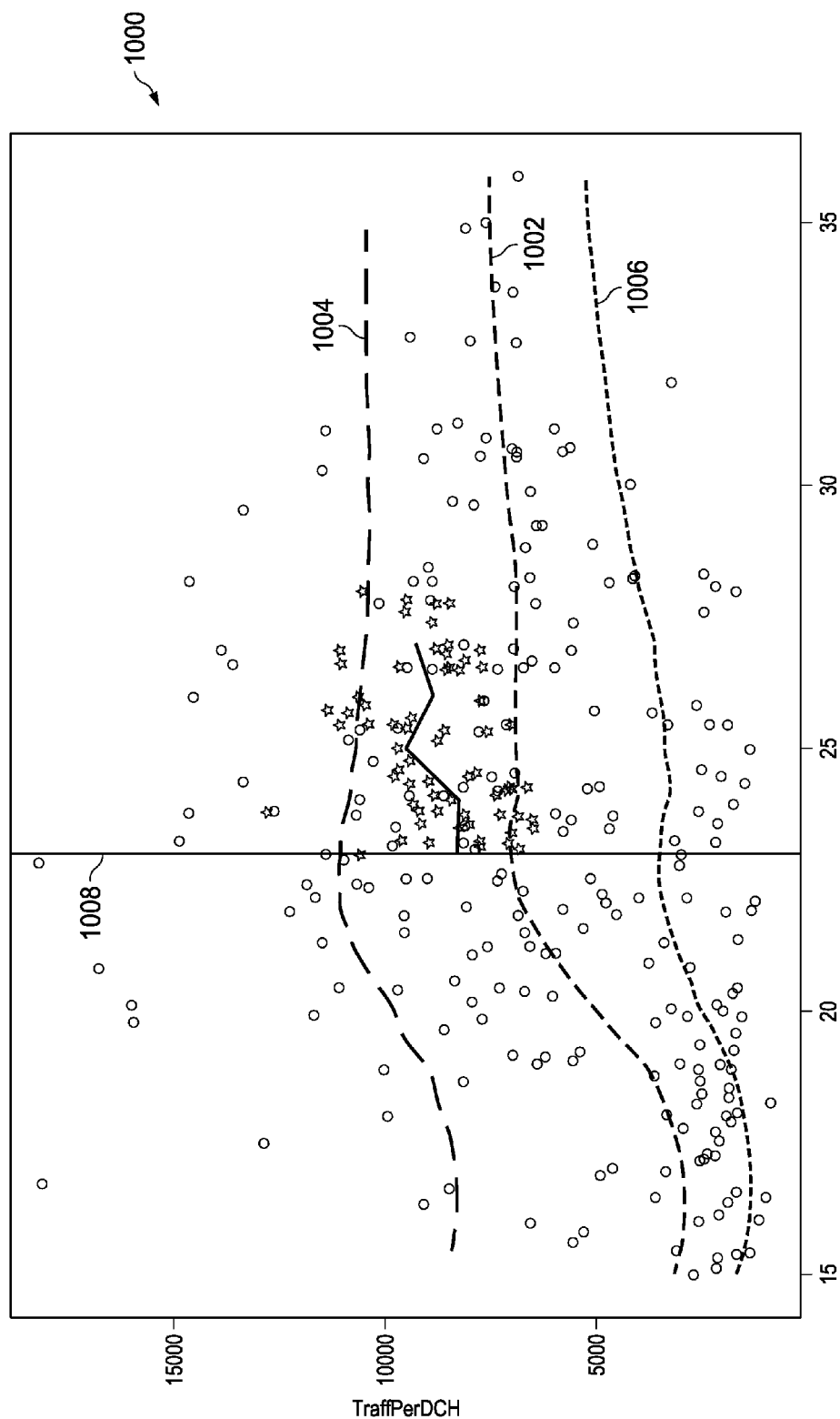
FIG. 10 illustrates a graph of a relationship between traffic per downlink channel of a cell and the number of UEs in the cell.

FIG. 10 illustrates a graph 1000 showing a traffic suppression turning point of a cell determined using the method described with respect to FIG. 3. The x-axis of graph 1000 represents the number of UEs in the cell (CellDCHUEs), and the y-axis represents the traffic per downlink channel in the cell (TraffPerDCH). In this example, relationships between traffic loads and three different KPIs are used, i.e., the average channel throughput for high speed downlink packet data traffic (CellHSDPAMeanChThroughput), downlink packet switch data total traffic (CellDlPSTraffic), and the average amount of traffic per UE (TrafficPerDCHUE). Curve 1002 represents a relationship between the TraffPerDCH and the CellDCHUEs according to a model built using a lossless regression method. Curves 1004 and 1006 define a range of TraffPerDCH in which the model is built with a high confidence. Three traffic suppression turning points (i.e., the number of UEs in the cell) are identified corresponding to the three KPIs, as shown in Table 1 below. That is, using the CellHSDPAMeanChThroughput as the KPI, the identified traffic suppression turning point is 27 UEs. The identified traffic suppression turning point is the same when sing CellDlPSTraffic or TrafficPerDCHUE as the KPI, which is 23 UEs. A final traffic suppression turning point is determined using the three traffic suppression turning points in Table 1 based on different detection strategies, and is shown in Table 2. For example, if an aggressive strategy is used, then the lowest number of UEs among the three traffic suppression turning points may be selected, i.e., 23 UEs. If a conservative strategy is used, then the greatest number of UEs among the three traffic suppression turning points may be selected, i.e., 27 UEs. Different KPIs and different detection strategies may be used to determine the traffic suppression turning point. Vertical line 1008 indicates the traffic suppression turning point determined. The dots in the graph 1000 indicate measurement values of the KPIs, and the stars indicates the predicted values of the KPIs.

TABLE 1

| Relationship | Result (# of UEs) for turning point |
|---|---|
| Traffic load vs. CellHSDPAMeanChThroughput | 27 |
| Traffic load vs. CellDlPSTraffic | 23 |
| Traffic load vs. TrafficPerDCHUE | 23 |

TABLE 2

| Detection Strategy | Final Result for turning point |
|---|---|
| Lowest loading (most aggressive) | 23 |
| Highest loading (most conservative) | 27 |
| Median loading | 23 |

The embodiment methods above for detecting a traffic suppression turning point in a communications system require limited engineering knowledge. No hard thresholds, as used in conventional approaches are needed. Relationships between network traffic load and KPIs are automatically learned, and a suppressed traffic suppression turning point is identified when a particular traffic behavior change is detected, e.g., the traffic behavior change satisfies a criteria. The embodiment methods also provide a generic mechanism that can be used in multiple markets. In an embodiment, multiple relationships are modeled at the same time to allow engineers to control how quickly a traffic suppression turning point may be identified, e.g., using a lower behavior turning point, or using a higher behavior turning point, etc.

The embodiment methods have been tested using sample data from wireless communications markets, showing improved performance in identifying a traffic suppression turning point over conventional engineering rule-based approaches. Results of identified traffic suppression turning points were compared with labels provided by a subject matter expert (SME) approach, and identification accuracy of the embodiment methods is shown above 90%. Specifically, the identification accuracy for one market is about 90%, and the identification accuracy for another market is about 91%. Table 3 below shows the identification accuracy and miss-detection rate for identifying traffic suppression turning points using the embodiment methods and the SME approach. As shown, the traffic suppression identification accuracy across two markets (i.e., Guangzhou and Indonesia) is about 90.5% when using the embodiment methods, and comparatively, 43% when using the SME approach. The traffic suppression identification mis-detection rate across the two markets is about 0.8% when using the embodiment methods and about 2.7% when using the SME approach.

TABLE 3

| | Guangzhou | | Indonesia | |
|---|---|---|---|---|
| | Embodiment methods | SME | Embodiment methods | SME |
| Identification Accuracy | 90% | 34% | 91% | 52% |
| Miss-detection Rate | 0.5% | 5.4% | 1.1% | 0% |

Figure 11:
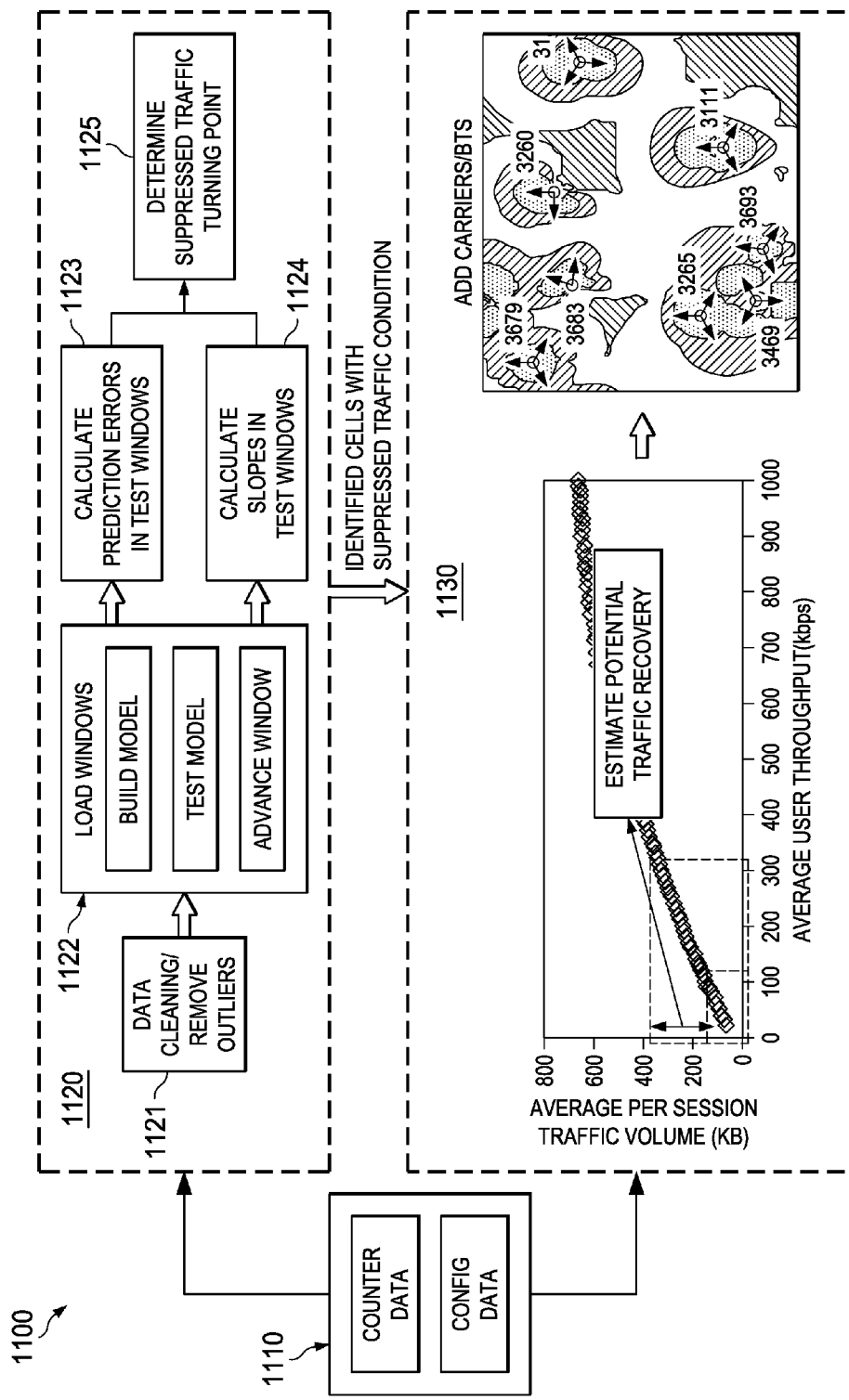
FIG. 11 illustrates a diagram of an embodiment method for network expansion.

FIG. 11 illustrates a diagram of an embodiment method 1100 for network expansion. The method 1100 includes three parts, i.e., data input (block 1110), traffic suppression turning point detection (block 1120) and network expansion planning (block 1130). As shown, counter data is obtained and provided from block 1110 for traffic suppression turning point identification in block 1120, and identified traffic suppression turning points are reported for network expansion planning and implementation in block 1130 using cell configuration data provided from block 1110. The counter data from block 1110 may first be processed for data cleaning in block 1121, such as processed to remove outliers. In block 1122, the cleaned data may be used to build models modeling relationships between traffic loads and KPIs and to test the built models in different load windows. The models and testing results are used to calculate prediction errors in different testing windows in block 1123. The models (i.e., actual measurement values of KPIs corresponding to traffic load) may also be used to calculate slopes in different testing windows in block 1124. The prediction errors and/or the slopes may then be used to determine a traffic suppression turning point in block 1125. Network engineers may use the determined traffic suppression turning point to perform network expansion planning, and configure the network to increase its capacity according to what has been planned, taking into consideration of other requirements and restrictions, such as resources available and needed, potential traffic recovery needed.

Figure 12:
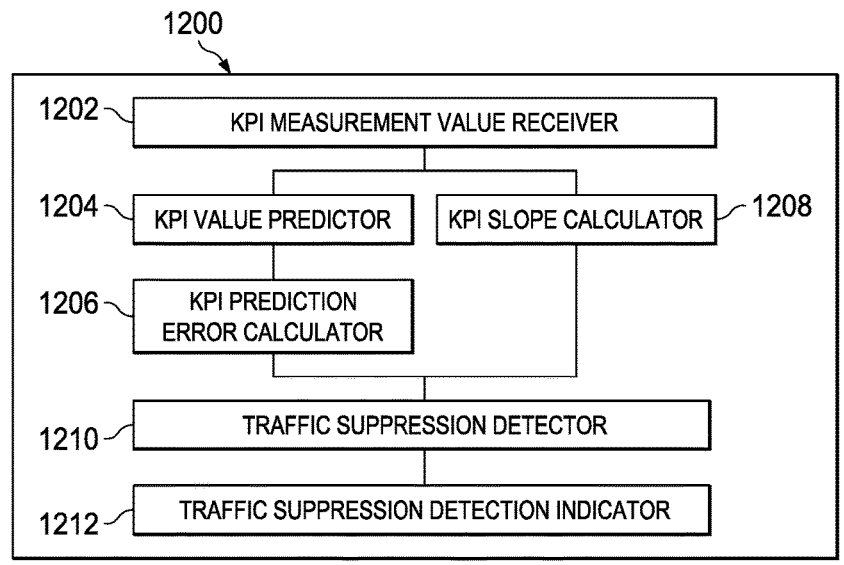
FIG. 12 illustrates a block diagram of an embodiment apparatus for detecting a traffic suppression turning point in a communications system.

FIG. 12 illustrates a block diagram of an embodiment apparatus 1200 adapted for detecting a traffic suppression turning point in a communications system. The apparatus 1200 includes a KPI measurement value receiver 1202, a KPI value predictor 1204, a KPI prediction error calculator 1206, a KPI slope calculator 1208, a traffic suppression detector 1210, and a traffic suppression detection indicator 1212. The KPI measurement value receiver 1202 may be configured to receive measurement values of a KPI generated in a wireless network experiencing traffic loads within a load range. The KPI measurement value receiver 1202 may receive the KPI measurement values from a different device, or retrieve the KPI measurement values from a storage medium.

The KPI value predictor 1204 may be configured to predict values for a KPI if a wireless network experienced traffic loads within a range based on a set of measurement values of the KPI within another range. For example, the KPI value predictor 1204 may predict values for a KPI corresponding to network traffic loads within an upper range based on KPI measurement values obtained corresponding to network traffic loads within a lower range. The KPI prediction error calculator 1206 may be configured to calculate a prediction error for a KPI corresponding to a traffic load range, based on differences between a set of predicted values for the KPI within the traffic load range and a set of subsequent measurement values of the KPI within the traffic load range. For example, the KPI prediction error calculator 1206 may calculate a cumulative sum of prediction errors for a KPI based on differences between the predicted values and the subsequent measurement values of the KPI. The apparatus 1200 may iteratively predict values for a KPI and calculate a set of prediction errors for the KPI corresponding to a plurality of traffic load ranges, utilizing the KPI value predictor 1204 and the KPI prediction error calculator 1206. The plurality of traffic load ranges is different than one another.

The KPI slope calculator 1208 may be configured to calculate a slope value for a KPI corresponding to a traffic load range based on measurement values of the KPI within the traffic load range and the traffic load range. The apparatus 1200 may also iteratively calculate a set of slope values for the KPI corresponding to a plurality of traffic load ranges in a sequence of evaluation periods, during which a wireless network experiences traffic loads within the plurality of traffic load ranges. The plurality of traffic load ranges is different than one another.

The traffic suppression detector 1210 may be configured to detect or identify a traffic suppression condition in a wireless network based on KPI prediction errors, KPI slope values, or both. For example, the traffic suppression detector 1210 may identify a traffic suppression condition when a prediction error in a set of KPI prediction errors calculated for a KPI corresponding to a plurality of traffic load ranges satisfies a set of conditions. Alternatively, the traffic suppression detector 1210 may identify a traffic suppression condition when a slope value in a set of slope values calculated for the KPI corresponding to a plurality of load ranges satisfies a criteria. In another example, the traffic suppression detector 1210 may determine a traffic suppression condition based on the traffic suppression conditions identified based on the KPI prediction errors and the KPI slopes. The traffic suppression detection indicator 1212 may be configured to indicate that a traffic suppression condition is detected or identified when the traffic suppression detector 1210 has detected a traffic suppression condition. The traffic suppression detection indicator 1212 may send an indication indicating detection of a traffic suppression condition.

Figure 13:
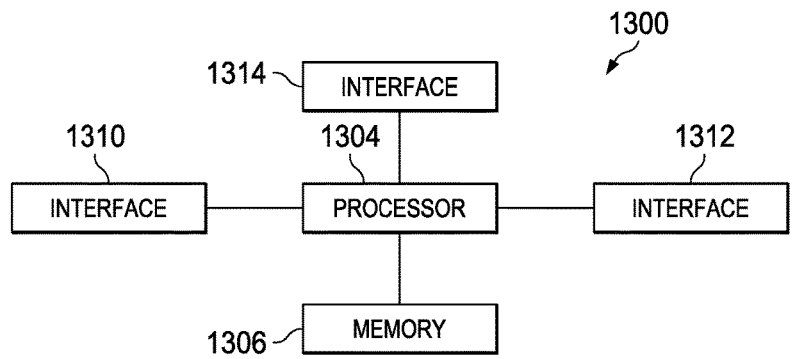
FIG. 13 illustrates a diagram of an embodiment processing system.

FIG. 13 illustrates a block diagram of an embodiment processing system 1300 for performing methods described herein, which may be installed in a host device. As shown, the processing system 1300 includes a processor 1304, a memory 1306, and interfaces 1310-1314, which may (or may not) be arranged as shown in the figure. The processor 1304 may be any component or collection of components adapted to perform computations and/or other processing related tasks, and the memory 1306 may be any component or collection of components adapted to store programming and/or instructions for execution by the processor 1304. In an embodiment, the memory 1306 includes a non-transitory computer readable medium. The non-transitory computer readable medium may store computer instructions, and the computer instructions, when executed by the processor 1304, may cause the processor 1304 to perform the methods of the present disclosure. A non-transitory computer-readable medium includes all types of computer readable media, including magnetic storage media, optical storage media, flash media and solid state storage media. It should be understood that software can be installed in and sold with a device/apparatus for performing the methods herein. Alternatively the software can be obtained and loaded into such a device/apparatus, including obtaining the software through a physical medium or distribution system, including, for example, from a server owned by the software creator or from a server not owned but used by the software creator. The software can be stored on a server for distribution over the Internet, for example.

The interfaces 1310, 1312, 1314 may be any component or collection of components that allow the processing system 1300 to communicate with other devices/components and/or a user. For example, one or more of the interfaces 1310, 1312, 1314 may be adapted to communicate data, control, or management messages from the processor 1304 to applications installed on the host device and/or a remote device. As another example, one or more of the interfaces 1310, 1312, 1314 may be adapted to allow a user or user device (e.g., personal computer (PC), etc.) to interact/communicate with the processing system 1300. The processing system 1300 may include additional components not depicted in the figure, such as long term storage (e.g., non-volatile memory, etc.).

In some embodiments, the processing system 1300 is included in a network device that is accessing, or part otherwise of, a telecommunications network. In one example, the processing system 1300 is in a network-side device in a wireless or wireline telecommunications network, such as a base station, a relay station, a scheduler, a controller, a gateway, a router, an applications server, or any other device in the telecommunications network. In other embodiments, the processing system 1300 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 14:
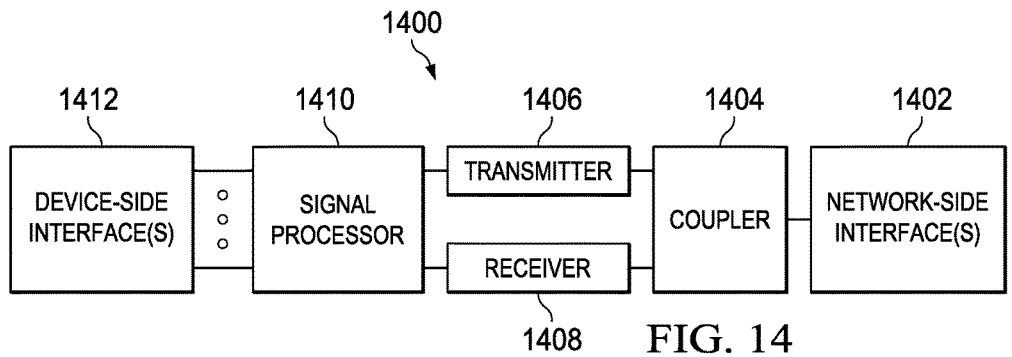
FIG. 14 illustrates a diagram of an embodiment transceiver.

In some embodiments, one or more of the interfaces 1310, 1312, 1314 connects the processing system 1300 to a transceiver adapted to transmit and receive signaling over the telecommunications network. FIG. 14 illustrates a block diagram of a transceiver 1400 adapted to transmit and receive signaling over a telecommunications network. The transceiver 1400 may be installed in a host device. As shown, the transceiver 1400 comprises a network-side interface 1402, a coupler 1404, a transmitter 1406, a receiver 1408, a signal processor 1410, and a device-side interface 1412. The network-side interface 1402 may include any component or collection of components adapted to transmit or receive signaling over a wireless or wireline telecommunications network. The coupler 1404 may include any component or collection of components adapted to facilitate bi-directional communication over the network-side interface 1402. The transmitter 1406 may include any component or collection of components (e.g., up-converter, power amplifier, etc.) adapted to convert a baseband signal into a modulated carrier signal suitable for transmission over the network-side interface 1402. The receiver 1408 may include any component or collection of components (e.g., down-converter, low noise amplifier, etc.) adapted to convert a carrier signal received over the network-side interface 1402 into a baseband signal. The signal processor 1410 may include any component or collection of components adapted to convert a baseband signal into a data signal suitable for communication over the device-side interface(s) 1412, or vice-versa. The device-side interface(s) 1412 may include any component or collection of components adapted to communicate data-signals between the signal processor 1410 and components within the host device (e.g., the processing system 1300, local area network (LAN) ports, etc.).

The transceiver 1400 may transmit and receive signaling over any type of communications medium. In some embodiments, the transceiver 1400 transmits and receives signaling over a wireless medium. For example, the transceiver 1400 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1402 comprises one or more antenna/radiating elements. For example, the network-side interface 1402 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1400 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a predicting unit/module, a calculating unit/module, an identifying unit/module, a determining unit/module, and/or a detecting unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A computer-implemented method for detecting a traffic suppression turning point in a communications system, comprising:
    receiving, by a device, a set of measurement values of a key performance indicator (KPI) generated in a wireless network experiencing traffic loads within a lower range during a first period;
    predicting, by the device, prior to a subsequent period, values for the KPI if the wireless network experienced traffic loads within an upper range based on the set of measurement values of the KPI;
    receiving, by the device, subsequent measurement values of the KPI generated in the wireless network experiencing traffic loads within the upper range during the subsequent period;
    calculating, by the device, a prediction error for the KPI corresponding to the upper range, based on differences between the predicted values for the KPI and the subsequent measurement values of the KPI; and
    identifying, by the device, a traffic suppression condition in the wireless network based on the prediction error for the KPI when a prediction error criteria is satisfied.

2. The computer-implemented method of claim 1, wherein calculating the prediction error for the KPI comprises calculating a cumulative sum of prediction errors for the KPI based on differences between the predicted values and the subsequent measurement values of the KPI.

3. The computer-implemented method of claim 2, wherein calculating the prediction error for the KPI comprises calculating the cumulative sum of prediction errors by:
    determining a difference between each subsequent measurement value of the KPI and a corresponding predicted value of the KPI over each observed instance during which the wireless network experiences traffic loads within the upper range during the subsequent period; and
    calculating a cumulative sum of the differences between the subsequent measurement values of the KPI and the predicted values of the KPI.

4. The computer-implemented method of claim 1, further comprising:
    iteratively predicting values for the KPI and calculating a set of prediction errors for the KPI corresponding to a plurality of upper ranges, the plurality of upper ranges different than one another.

5. The computer-implemented method of claim 4, wherein the prediction error criteria is satisfied when a first prediction error in the set of prediction errors satisfies a set of conditions.

6. The computer-implemented method of claim 5, wherein the first prediction error satisfies the set of conditions when:
    (i) the first prediction error exceeds any other prediction error in the set of prediction errors;

(ii) the first prediction error exceeds an average of the set of prediction errors by at least one standard deviation of the set of prediction errors; and (iii) the first prediction error is greater than a threshold.

7. The computer-implemented method of claim 6, wherein the first prediction error is greater than a threshold comprises the first prediction error exceeds a second prediction error in the set of prediction errors by a margin.

8. The computer-implemented method of claim 1, wherein the traffic suppression condition refers to a threshold number of user equipments (UEs) that can be supported by the wireless network.

9. The computer-implemented method of claim 1, further comprising:
sending an indication indicating detection of the traffic suppression condition.

10. The computer-implemented method of claim 1, wherein the KPI comprises a mean channel throughput, an average traffic volume per UE, or a total traffic volume per cell.

11. An apparatus for detecting a traffic suppression turning point in a communication system comprising:
a non-transitory memory storage comprising instructions; and
one or more processors in communication with the memory storage, wherein the one or more processors execute the instructions to:
retrieve a set of measurement values of a key performance indicator (KPI) generated in a wireless network experiencing traffic loads within a lower range during a first period;
predict, prior to a subsequent period, values for the KPI if the wireless network experienced traffic loads within an upper range based on the set of measurement values of the KPI;
retrieve subsequent measurement values of the KPI generated in the wireless network experiencing traffic loads within the upper range during the subsequent period;
calculate a prediction error for the KPI corresponding to the upper range, based on differences between the predicted values for the KPI and the subsequent measurement values of the KPI; and
identify a traffic suppression condition in the wireless network based on the prediction error for the KPI when a prediction error criteria is satisfied.

12. The apparatus of claim 11, wherein the one or more processors execute the instructions to further:
iteratively predict values for the KPI and calculate a set of prediction errors for the KPI corresponding to a plurality of upper ranges, the plurality of upper ranges different than one another.

13. The apparatus of claim 12, wherein the prediction error criteria is satisfied when a first prediction error in the set of prediction errors satisfies a set of conditions.

14. The apparatus of claim 11, wherein the traffic suppression condition refers to a threshold number of user equipments (UEs) that can be supported by the wireless network.

15. The apparatus of claim 11, wherein the KPI comprises a mean channel throughput, an average traffic volume per UE, or a total traffic volume per cell.

16. The apparatus of claim 11, wherein the prediction error for the KPI is calculated by calculating a cumulative sum of prediction errors for the KPI based on differences between the predicted values and the subsequent measurement values of the KPI.

17. The apparatus of claim 16, wherein the cumulative sum of prediction errors is calculated by:
determining a difference between each subsequent measurement value of the KPI and a corresponding predicted value of the KPI over each observed instance during which the wireless network experiences traffic loads within the upper range during the subsequent period; and
calculating a cumulative sum of the differences between the subsequent measurement values of the KPI and the predicted values of the KPI.

18. The apparatus of claim 12, wherein the prediction error criteria is satisfied when a first prediction error in the set of prediction errors satisfies a set of conditions, and the set of conditions are satisfied when:
(i) the first prediction error exceeds any other prediction error in the set of prediction errors;
(ii) the first prediction error exceeds an average of the set of prediction errors by at least one standard deviation of the set of prediction errors; and
(iii) the first prediction error is greater than a threshold.

19. The apparatus of claim 18, wherein the first prediction error is greater than a threshold comprises the first prediction error exceeds a second prediction error in the set of prediction errors by a margin.

20. A non-transitory computer-readable media storing computer instructions for detecting a traffic suppression turning point in a communications system, that when executed by one or more processors, cause the one or more processors to perform the steps of:
receiving a set of measurement values of a key performance indicator (KPI) generated in a wireless network experiencing traffic loads within a lower range during a first period;
predicting, prior to a subsequent period, values for the KPI if the wireless network experienced traffic loads within an upper range based on the set of measurement values of the KPI;
receiving, subsequent measurement values of the KPI generated in the wireless network experiencing traffic loads within the upper range during the subsequent period;
calculating, a prediction error for the KPI corresponding to the upper range, based on differences between the predicted values for the KPI and the subsequent measurement values of the KPI; and
identifying, a traffic suppression condition in the wireless network based on the prediction error for the KPI when a prediction error criteria is satisfied.

21. The non-transitory computer-readable media of claim 20, wherein the steps further comprise:
iteratively predict values for the KPI and calculating a set of prediction errors for the KPI corresponding to a plurality of upper ranges, the plurality of upper ranges different than one another.

22. The non-transitory computer-readable media of claim 21, wherein the prediction error criteria is satisfied when a first prediction error in the set of prediction errors satisfies a set of conditions.

23. The non-transitory computer-readable media of claim 22, wherein the first prediction error satisfies the set of conditions when:
(i) the first prediction error exceeds any other prediction error in the set of prediction errors;

(ii) the first prediction error exceeds an average of the set of prediction errors by at least one standard deviation of the set of prediction errors; and (iii) the first prediction error is greater than a threshold.

24. The non-transitory computer-readable media of claim 20, wherein the traffic suppression condition refers to a threshold number of user equipments (UEs) that can be supported by the wireless network.

25. The non-transitory computer-readable media of claim 20, wherein the KPI comprises a mean channel throughput, an average traffic volume per UE, or a total traffic volume per cell.

26. An apparatus for detecting a traffic suppression turning point in a communication system comprising:
  a receiver that is configured to receive a set of measurement values of a key performance indicator (KPI) generated in a wireless network experiencing traffic loads within a lower range during a first period, and receive subsequent measurement values of the KPI generated in the wireless network experiencing traffic loads within an upper range during a subsequent period; and
  a processor coupled with the receiver, the processor configured to predict, prior to the subsequent period, values for the KPI if the wireless network experienced traffic loads within the upper range based on the set of measurement values of the KPI, to calculate a prediction error for the KPI corresponding to the upper range based on differences between the predicted values for the KPI and the subsequent measurement values of the KPI, and to identify a traffic suppression condition in the wireless network based on the prediction error for the KPI when a prediction error criteria is satisfied.

27. The apparatus of claim 26, wherein the processor is configured to further:
  iteratively predict values for the KPI and calculate a set of prediction errors for the KPI corresponding to a plurality of upper ranges, the plurality of upper ranges different than one another.

28. The apparatus of claim 27, wherein the prediction error criteria is satisfied when a first prediction error in the set of prediction errors satisfies a set of conditions, and the set of conditions are satisfied when:
  (i) the first prediction error exceeds any other prediction error in the set of prediction errors;
  (ii) the first prediction error exceeds an average of the set of prediction errors by at least one standard deviation of the set of prediction errors; and
  (iii) the first prediction error is greater than a threshold.

29. The apparatus of claim 26, wherein the traffic suppression condition refers to a threshold number of user equipments (UEs) that can be supported by the wireless network.

30. The apparatus of claim 26, wherein the KPI comprises a mean channel throughput, an average traffic volume per UE, or a total traffic volume per cell.

31. The apparatus of claim 26, wherein the prediction error for the KPI is calculated by calculating a cumulative sum of prediction errors for the KPI based on differences between the predicted values and the subsequent measurement values of the KPI.

* * * * *